(12) United States Patent
Gendre (10) Patent No.: US 10,763,599 B2
(45) Date of Patent: Sep. 1, 2020

(54) CATENARY GROUNDING DEVICE FALL RESTRICTION APPARATUS AND METHOD OF USE

(71) Applicant: DUBUIS ET CIE S.A.S., Villebarou (FR)

(72) Inventor: Guillaume Gendre, Villebarou (FR)

(73) Assignee: Dubuis et Cie S.A.S., Villebarou (FR)

( * ) Notice: Subject to any disclaimer, the term of this patent is extended or adjusted under 35 U.S.C. 154(b) by 0 days.

(21) Appl. No.: 16/375,414

(22) Filed: Apr. 4, 2019

(65) Prior Publication Data

US 2019/0312366 A1 Oct. 10, 2019

(30) Foreign Application Priority Data

Apr. 5, 2018 (EP) .................................... 18305402

(51) Int. Cl.
| | |
|---|---|
| *H01R 43/00* | (2006.01) |
| *H01R 4/66* | (2006.01) |
| *H02G 1/02* | (2006.01) |
| *H02G 7/22* | (2006.01) |
| *B60M 1/02* | (2006.01) |
| *H01R 11/14* | (2006.01) |

(52) U.S. Cl.
CPC ................ *H01R 4/66* (2013.01); *B60M 1/02* (2013.01); *H01R 43/00* (2013.01); *H02G 1/02* (2013.01); *H02G 7/22* (2013.01); *H01R 11/14* (2013.01)

(58) Field of Classification Search
CPC .......... H01R 43/00; H01R 4/66; H01R 11/14; H02G 7/22; H02G 1/02; B60M 1/02

USPC ............................................ 439/477–479, 92
See application file for complete search history.

(56) References Cited

U.S. PATENT DOCUMENTS

| | | | | |
|---|---|---|---|---|
| 1,045,680 | A * | 11/1912 | Cronin ..................... | H02G 1/02 294/174 |
| 1,484,194 | A * | 2/1924 | Servis ..................... | C25D 17/10 204/297.09 |
| 1,603,035 | A * | 10/1926 | Evans ..................... | H01R 11/14 439/479 |
| 1,648,326 | A * | 11/1927 | Sawyer ................... | H01R 11/14 439/477 |
| 1,712,067 | A * | 5/1929 | Bodendieck ........... | H01R 11/15 439/479 |
| 1,833,756 | A * | 11/1931 | Perazzoli ............... | H01R 11/14 439/477 |

(Continued)

FOREIGN PATENT DOCUMENTS

| | | |
|---|---|---|
| CN | 102810774 A | 12/2012 |
| DE | 20011498 U | 12/2001 |

(Continued)

OTHER PUBLICATIONS

International Search Report dated Sep. 27, 2018.

*Primary Examiner* — Abdullah A Riyami
*Assistant Examiner* — Vladimir Imas
(74) *Attorney, Agent, or Firm* — Michael P. Leary; Kofi A. Schulterbrandt (57) ABSTRACT

An apparatus for restricting a contact head of a catenary grounding device unintentionally falling from a catenary in use that is connectable to the contact head. The apparatus forming part of a contact head of a catenary grounding device for restricting the contact head unintentionally falling from a catenary in use.

9 Claims, 8 Drawing Sheets

(56) References Cited

U.S. PATENT DOCUMENTS

| | | | | |
|---|---|---|---|---|
| 1,862,073 A * | 6/1932 | Woolson | H01R 11/14 | 439/477 |
| 1,949,646 A * | 3/1934 | Dibner | H01R 11/15 | 439/479 |
| 1,968,736 A * | 7/1934 | Bodendieck | H01R 11/15 | 439/479 |
| 2,009,289 A * | 7/1935 | Caird | H01R 11/15 | 439/479 |
| 2,016,749 A * | 10/1935 | Mack | H01R 11/15 | 81/53.1 |
| 2,031,921 A * | 2/1936 | Bodendieck | H01R 11/14 | 439/92 |
| 2,095,137 A * | 10/1937 | Johnson | H01R 11/15 | 81/53.1 |
| 2,218,397 A * | 10/1940 | Hermann | H01R 11/14 | 337/193 |
| 2,385,708 A * | 9/1945 | Johnson | F16B 45/025 | 294/174 |
| 2,472,000 A * | 5/1949 | Bowen | H01R 11/14 | 200/51.07 |
| 2,486,696 A * | 11/1949 | Wenzel | D06F 53/04 | 248/353 |
| 2,911,611 A * | 11/1959 | Miller | H01R 11/14 | 439/478 |
| 2,946,559 A * | 7/1960 | Pickett | H02G 1/04 | 254/134.3 PA |
| 3,132,914 A * | 5/1964 | Wengen | H01R 11/15 | 439/479 |
| 3,142,525 A * | 7/1964 | Roosman | H01R 11/15 | 439/479 |
| 3,209,307 A * | 9/1965 | Hoffman | H01R 4/38 | 439/479 |
| 3,516,050 A * | 6/1970 | Lenhart, Jr. | H01R 4/06 | 439/479 |
| 3,706,436 A * | 12/1972 | Lindsey | F16L 3/16 | 248/63 |
| 3,824,835 A * | 7/1974 | Jackson | B21D 7/06 | 72/389.9 |
| 3,908,962 A * | 9/1975 | Ross | E21F 17/06 | 254/134.3 R |
| 3,970,286 A * | 7/1976 | Ross | E21F 17/06 | 254/134.3 R |
| 4,133,591 A * | 1/1979 | West | H01R 11/15 | 439/479 |
| 4,260,848 A * | 4/1981 | Amaya | H02G 15/117 | 174/41 |
| 4,423,853 A * | 1/1984 | Davis, Sr. | H02G 1/04 | 254/134.3 R |
| 4,526,428 A * | 7/1985 | Sachs | H02G 7/053 | 24/115 R |
| 4,846,725 A * | 7/1989 | Williams | H01R 11/15 | 439/479 |
| 4,934,949 A * | 6/1990 | Charneski | H01R 11/15 | 439/387 |
| 5,064,172 A * | 11/1991 | Hereford | H02G 1/04 | 254/134.3 PA |
| 5,195,704 A * | 3/1993 | Louie | F16L 3/105 | 248/316.6 |
| 5,228,657 A * | 7/1993 | Hall | E04H 12/20 | 248/218.4 |
| 5,299,845 A * | 4/1994 | Gabriel | B66C 1/34 | 294/2 |
| 5,556,299 A * | 9/1996 | Finke | H01R 11/15 | 439/479 |
| 5,593,327 A * | 1/1997 | Hlinsky | H01R 4/363 | 439/793 |
| 5,599,005 A * | 2/1997 | Sauber | H02G 1/04 | 254/134.3 PA |
| 5,700,980 A * | 12/1997 | Bello | H02G 7/12 | 174/146 |
| 5,941,507 A * | 8/1999 | Page | B65H 57/14 | 254/134.3 PA |
| 6,070,316 A * | 6/2000 | Einsle | G02B 6/483 | 174/45 R |
| 6,315,269 B1 * | 11/2001 | Fleury | B66D 3/046 | 254/134.3 PA |
| 6,540,207 B1 * | 4/2003 | Barnes | H02G 1/04 | 254/134.3 PA |
| 6,595,477 B2 * | 7/2003 | Roberts | H01B 17/16 | 174/138 R |
| 6,892,990 B2 * | 5/2005 | Pisczak | H02G 7/053 | 248/62 |
| 7,143,954 B2 * | 12/2006 | Netzel | B60M 5/02 | 238/14.05 |
| 7,323,636 B1 * | 1/2008 | Borges | H02G 7/12 | 174/41 |
| 7,578,488 B2 * | 8/2009 | Kiser | H02G 7/05 | 248/218.4 |
| 7,874,543 B2 * | 1/2011 | Theisen | H02G 7/10 | 254/134.3 CL |
| 8,651,891 B2 * | 2/2014 | Balfour | H01R 4/489 | 439/479 |
| 9,350,145 B2 * | 5/2016 | Jean | H02G 1/02 | |
| 9,379,527 B2 * | 6/2016 | Jean | H02G 1/04 | |
| 9,812,794 B2 * | 11/2017 | Cawood | H02G 1/02 | |
| 9,932,110 B2 * | 4/2018 | McNally | B64C 39/024 | |
| 10,134,509 B1 * | 11/2018 | Pyron | H01B 17/14 | |
| 10,254,501 B2 * | 4/2019 | Baker | H02G 7/04 | |
| 2004/0084574 A1 * | 5/2004 | Goodwin | F16L 3/1233 | 248/63 |

FOREIGN PATENT DOCUMENTS

| | | |
|---|---|---|
| EP | 0769626 A | 4/1997 |
| EP | 0810691 B | 4/1999 |

* cited by examiner

CATENARY GROUNDING DEVICE FALL RESTRICTION APPARATUS AND METHOD OF USE

CROSS-REFERENCE TO RELATED APPLICATION

This application claims priority from European Patent Application No. 18305402.2, filed on Apr. 5, 2018, the disclosure of which is incorporated herein by reference.

BACKGROUND OF THE INVENTION

This specification relates to apparatus for restricting a contact head of a catenary grounding device unintentionally falling from a catenary in use, a contact head provided with such apparatus and method of use thereof.

Figure 1:
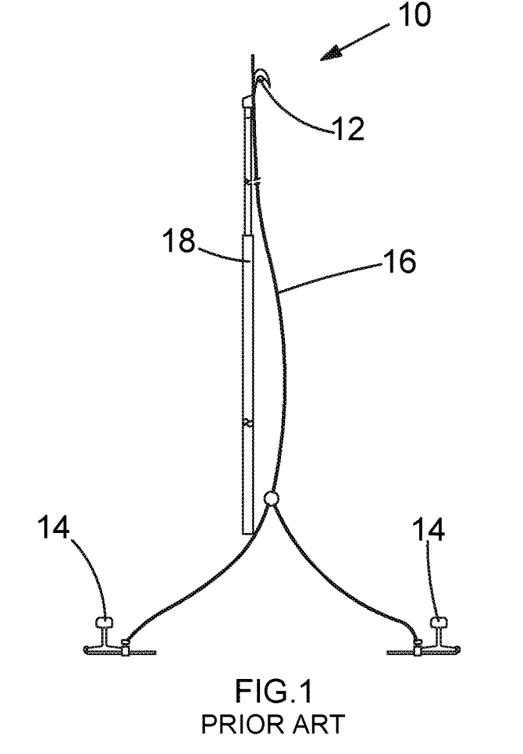
FIG. 1 illustrates a prior art catenary grounding device for short circuiting a catenary.
Figure 2:
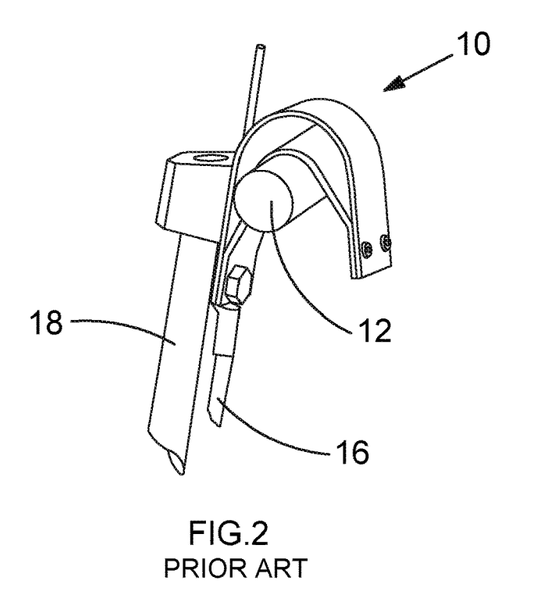
FIG. 2 illustrates a contact head of the prior art device in FIG. 1.

EP0810691B1 teaches a contact head for short circuiting a catenary that supplies electrical current to trains. During maintenance of such a catenary it is important to short circuit the catenary by electrically coupling it to ground. This is illustrated in FIG. 1 in which a contact head 10 hangs from a catenary 12 and electrically couples it to rail tracks 14 in contact with the ground via a wire arrangement 16. The pole 18 is used to lift the contact head 10 up into contact with the catenary 12. A close up of the contact head 10 hanging from the catenary 12 is illustrated in FIG. 2, wherein electrically conductive components of the contact head 10 electrically couple the catenary 12 to the wire arrangement 16. In high current situations electromagnetic forces gendered by current flow can force the contact head 10 out of hanging engagement with the catenary 12 causing it to fall. Other occurrences can cause the contact head 10 to fall from the catenary 12 such as wind. It is desired to restrict the contact head 10 from unintentionally falling in use in order to reduce risk of injury.

BRIEF SUMMARY OF THE INVENTION

According to an aspect of the present invention there is provided apparatus for restricting a contact head of a catenary grounding device unintentionally falling from a catenary in use, the apparatus comprising: means for coupling the apparatus to a said contact head; first and second arms moveable relative to each other which in a closed configuration cooperate to define a passage for surrounding a catenary in use, the first and second arms being moveable relative to each other out of the closed configuration against biasing means which acts to return the first and second arms into the closed configuration; and initial engagement means arranged such that when urged against a catenary in use the first and second arms are moved relative to each other from the closed configuration against action of the biasing means; wherein the apparatus is configured such that by urging the initial engagement means against a catenary in use the apparatus can be moved translationally relative to the catenary from a first position in which the initial engagement means first contacts the catenary to a second position in which the catenary is pinched between the first and second arms and further wherein the first and second arms are configured such that upon continued translational movement of the apparatus relative to the catenary in use the first arm disengages from the catenary while the second arm remains in contact therewith for causing the apparatus to turn relative to the catenary as the first and second arms move relative to each other and return to the closed configuration under action of the biasing means so that the passage defined by the arms surrounds the catenary.

According to another aspect of the present invention there is provided apparatus forming part of a contact head of a catenary grounding device for restricting the contact head unintentionally falling from a catenary in use, the apparatus comprising: first and second arms moveable relative to each other which in a closed configuration cooperate to define a passage for surrounding a catenary in use, the first and second arms being moveable relative to each other out of the closed configuration against biasing means which acts to return the first and second arms into the closed configuration; and initial engagement means arranged such that when urged against a catenary in use the first and second arms are moved relative to each other from the closed configuration against action of the biasing means; wherein the apparatus is configured such that by urging the initial engagement means against a catenary in use the apparatus can be moved translationally relative to the catenary from a first position in which the initial engagement means first contacts the catenary to a second position in which the catenary is pinched between the first and second arms and further wherein the first and second arms are configured such that upon continued translational movement of the apparatus relative to the catenary in use the first arm disengages from the catenary while the second arm remains in contact therewith for causing the apparatus to turn relative to the catenary as the first and second arms move relative to each other and return to the closed configuration under action of the biasing means so that the passage defined by the arms surrounds the catenary.

The apparatus may be configured such that when the first and second arms are in the closed configuration surrounding a catenary in use the first arm defines an upper section of the passage for restricting movement of the apparatus relative to the catenary having a downwards component of direction but not a lower section of the passage for restricting movement of the apparatus relative to the catenary having an upwards component of direction, whereas the second arm defines a lower section of the passage for restricting movement of the apparatus relative to the catenary having an upwards component of direction.

The apparatus may be configured such that when the first and second arms are in the closed configuration the section of the second arm defining the lower section of the passage does not overlap with the first arm.

The section of the first arm for defining the upper section of the passage may be shaped to extend over a catenary in use whereas the section of the second arm for defining the lower section of the passage may be shaped to extend under the catenary in use.

The first and second arms may be pivotally coupled relative to each other.

The initial engagement means may comprise two parts, the first part thereof being coupled to the first arm and the second part thereof being coupled to the second arm.

The first and second parts of the initial engagement means may define respective surfaces sloping away from each other when the first and second arms are in the closed configuration, optionally said respective surfaces may be arranged in a substantially V-shaped manner when the first and second arms are in the closed configuration.

According to another aspect of the present invention there is provided a method comprising the steps of: providing apparatus for restricting a contact head of a catenary grounding device unintentionally falling from a catenary in use, the apparatus comprising: means for coupling the apparatus to a said contact head; first and second arms moveable relative to each other which in a closed configuration cooperate to define a passage for surrounding a catenary in use, the first and second arms being moveable relative to each other out of the closed configuration against biasing means which acts to return the first and second arms into the closed configuration; and initial engagement means arranged such that when urged against a catenary in use the first and second arms are moved relative to each other from the closed configuration against action of the biasing means; coupling the apparatus to a contact head of a catenary grounding device; applying force having an upwards component to the apparatus for urging the initial engagement means against a catenary; moving the apparatus translationally relative to the catenary from a first position in which the initial engagement means first contacts the catenary to a second position in which the catenary is pinched between the first and second arms; moving the apparatus further translationally relative to the catenary so that the first arm disengages from the catenary while the second arm remains in contact therewith, whereby the apparatus is caused to turn relative to the catenary as the first and second arms move relative to each other and return to the closed configuration under action of the biasing means so the passage defined by the arms surrounds the catenary; and refraining from applying said force to the apparatus.

According to a further aspect of the present invention there is provided a method comprising the steps of: providing a contact head of a catenary grounding device having apparatus for restricting the contact head unintentionally falling from a catenary in use, the apparatus comprising: first and second arms moveable relative to each other which in a closed configuration cooperate to define a passage for surrounding a catenary in use, the first and second arms being moveable relative to each other out of the closed configuration against biasing means which acts to return the first and second arms into the closed configuration; and initial engagement means arranged such that when urged against a catenary in use the first and second arms are moved relative to each other from the closed configuration against action of the biasing means; applying force having an upwards component to the apparatus for urging the initial engagement means against a catenary; moving the apparatus translationally relative to the catenary from a first position in which the initial engagement means first contacts the catenary to a second position in which the catenary is pinched between the first and second arms; moving the apparatus further translationally relative to the catenary so that the first arm disengages from the catenary while the second arm remains in contact therewith, whereby the apparatus is caused to turn relative to the catenary as the first and second arms move relative to each other and return to the closed configuration under action of the biasing means so the passage defined by the arms surrounds the catenary; and refraining from applying said force to the apparatus.

The apparatus may be configured such that when the first and second arms are in the closed configuration surrounding a catenary in use the first arm defines an upper section of the passage for restricting movement of the apparatus relative to the catenary having a downwards component of direction but not a lower section of the passage for restricting movement of the apparatus relative to the catenary having an upwards component of direction, whereas the second arm defines a lower section of the passage for restricting movement of the apparatus relative to the catenary having an upwards component of direction.

The apparatus may be configured such that when the first and second arms are in the closed configuration the section of the second arm defining the lower section of the passage does not overlap with the first arm.

The section of the first arm for defining the upper section of the passage may be shaped to extend over the catenary in use whereas the section of the second arm for defining the lower section of the passage may be shaped to extend under the catenary in use.

The method may further comprise the steps of: applying force having an upwards component to the apparatus for urging the section of the second arm for defining the lower section of the passage against the catenary; turning the apparatus relative to the catenary whereby during rotation the second arm bears against the catenary for causing the first and second arms to move from the closed configuration; moving the apparatus relative to the catenary in a downwards direction wherein upon the apparatus being moved such that the catenary is no longer located between the first and second arms said arms return to the closed configuration under action of the biasing means.

BRIEF DESCRIPTION OF THE SEVERAL VIEWS OF THE DRAWINGS

Embodiments will now be described by way of non-limiting example with reference to the accompanying drawings, in which.

DETAILED DESCRIPTION OF THE PREFERRED EMBODIMENTS

Figure 3:
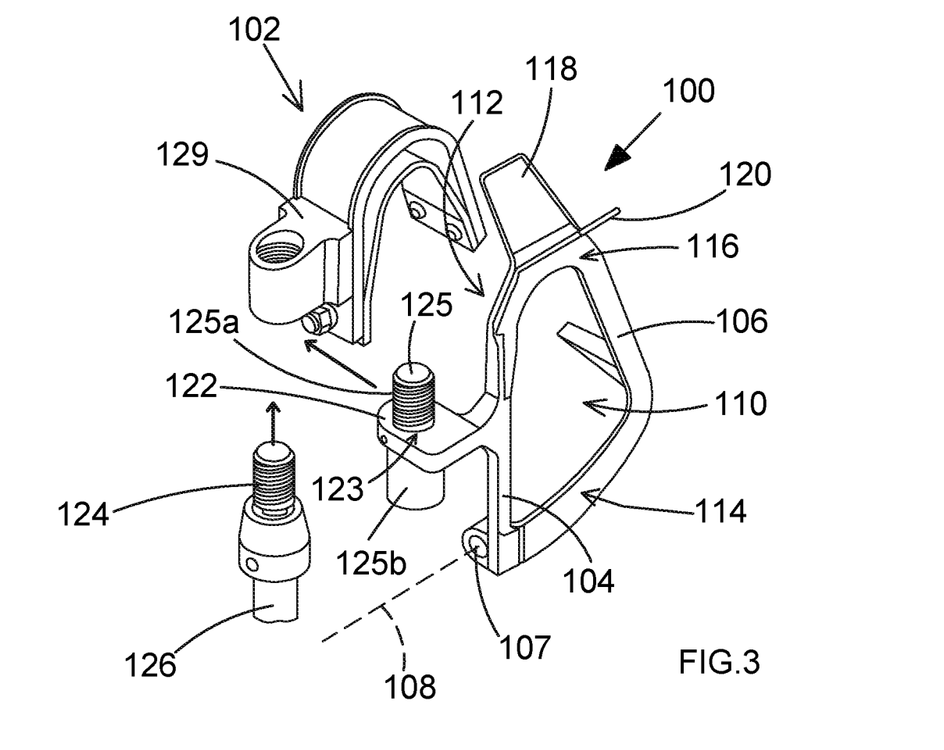
FIG. 3 illustrates an embodiment of an apparatus for restricting a contact head of a catenary grounding device from falling from a catenary in use, wherein the apparatus is shown prior to being coupled to a contact head and pole.

FIG. 3 illustrates apparatus 100 for restricting a contact head 102 of a catenary grounding device unintentionally falling from a catenary in use, whereby such a contact head 102 can be configured substantially similarly to a contact head of the kind described in EP0810691B1 acknowledged in the background section herein.

Figure 4:
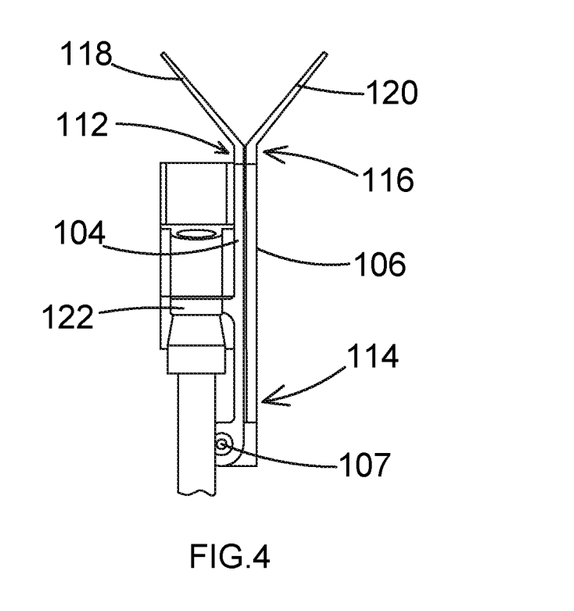
FIGS. 4 and 5 illustrate an assembled version of the arrangement in FIG. 3.
Figure 5:
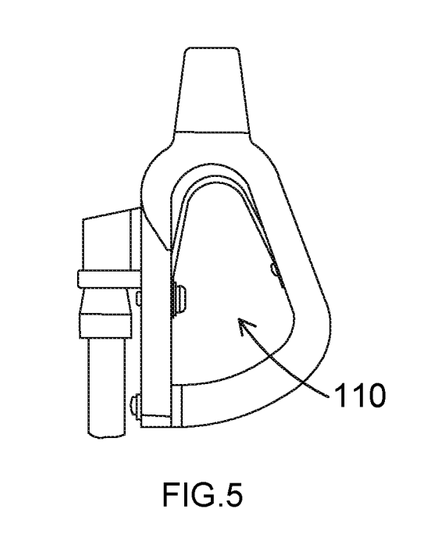

FIGS. 3 to 5 illustrate that the apparatus 100 has a first arm 104 and a second arm 106 that are pivotally coupled relative to each other about an axis 108 at a pivot connection 107. The first and second arms 104, 106 are illustrated in a closed configuration relative to each other in FIGS. 3 to 5, in which they cooperate to define a passage 110 for surrounding a catenary in use.

Figures 6A, 6B:
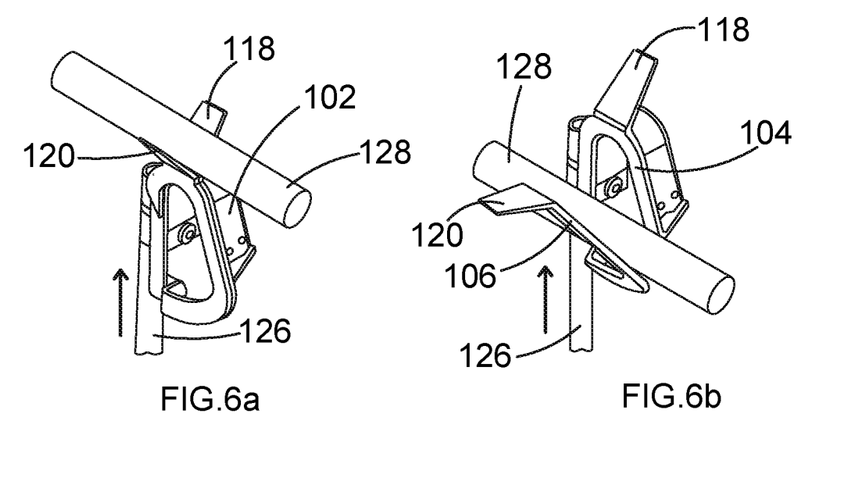
FIGS. 6A to 6E illustrate how the apparatus in FIGS. 3 to 5 is placed in use.
Figure 6C:
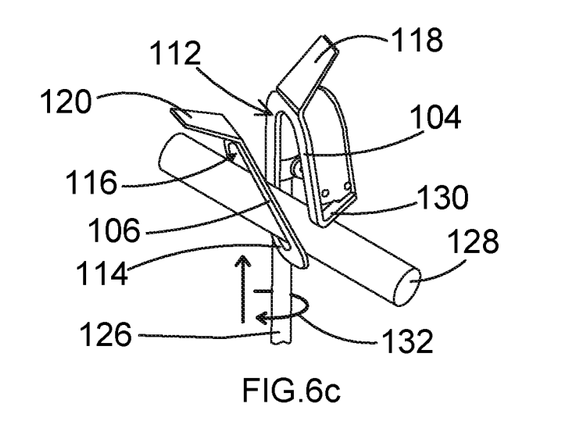

FIGS. 3 and 6C illustrate that the first arm 104 defines an upper section 112 of the passage 110 for restricting movement of the apparatus 100 relative to a catenary 128 having a downwards component of direction, although the first arm 104 does not define a lower section of the passage 100 for restricting movement of the apparatus 100 relative to a catenary 128 having an upwards component of direction. The first arm 104 extends away from the pivot connection 107 before extending back on itself to define a hook like shape for extending over a catenary 128 in use. It will be appreciated that other embodiments having a different shape to that illustrated in the drawings will be apparent on reading the foregoing disclosure.

FIGS. 3 and 6C illustrate that the second arm 106 defines a lower section 114 of the passage 110 for restricting movement of the apparatus 100 relative to a catenary 128 having an upwards component of direction. Furthermore the second arm 106 also defines an upper section 116 of the passage 110 for restricting movement of the apparatus 100 relative to a catenary 128 having a downwards component of direction. The second arm 106 extends away from the pivot connection 107 to define a hook like shape for extending under a catenary 128 in use, which further extends to overlap with the first arm 104 when said first and second arms 104, 106 are in the closed configuration, thereby defining the heretofore mentioned passage 110. Again it will be appreciated that other embodiments having a different shape to that illustrated in the drawings will be apparent on reading the foregoing disclosure.

Biasing means, to be described later on, are provided for urging the first and second arms 104, 106 into the closed configuration. Thus the first and second arms 104, 106 are moveable out of the closed configuration against action of the biasing means which acts to return the first and second arms 104, 106 into the closed configuration.

FIG. 4 illustrates that a first flange 118 extends from the first arm 104, whereas a second flange 120 extends from the second arm 106. These flanges 118, 120 are arranged on the first and second arms 104, 106 such that when said arms are in the closed configuration the flanges 118, 120 are located opposite each other and define respective surfaces sloping away from each other. In some embodiments said respective surfaces are arranged in a substantially V-shaped manner when the first and second arms are in the closed configuration.

FIGS. 3 to 5 illustrate that a coupling portion 122 extends from the first arm 104. The coupling portion 122 defines an opening 123 which extends along an axis that is perpendicular to the aforementioned axis 108 about which the first and second arms 104, 106 pivot. The apparatus 100 includes a fastener 125 selectively rotationally locked in the opening 123 of the coupling portion 122, whereby in the embodiment illustrated a top section 125a of the fastener defines a male thread for threadably engaging with a female thread of a mounting section 129 of a contact head 102 of a catenary grounding device. The bottom section 125b of the fastener 125 defines a female thread for threadably engaging with a threaded section 124 of a pole 126.

The coupling portion 122 is described in more detail with reference to FIGS. 5A to 5D.

Figure 5A:
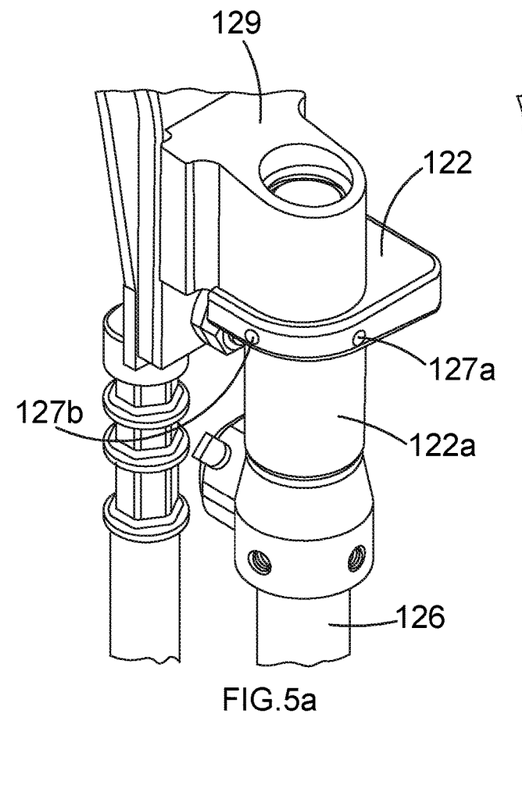
FIG. 5A illustrates the connection between the respective items in FIG. 3 when connected to each other.
Figure 5B:
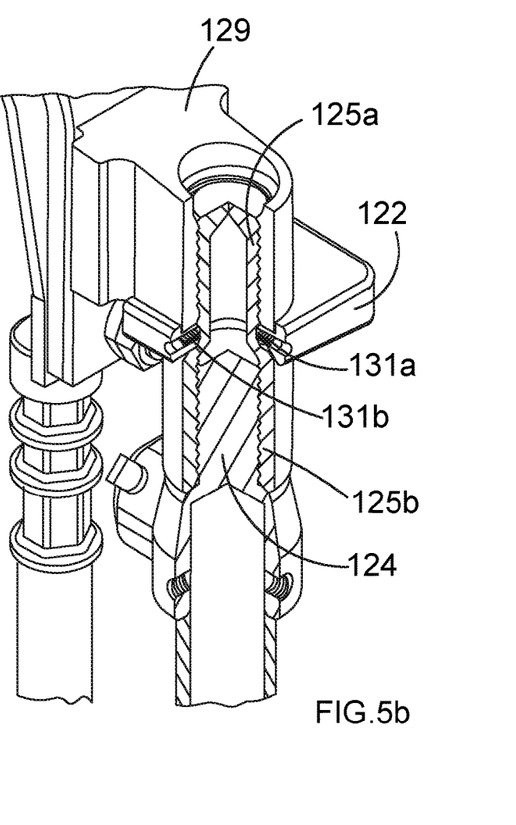
FIG. 5B is a part cross-sectional view of FIG. 5A.
Figure 5C:
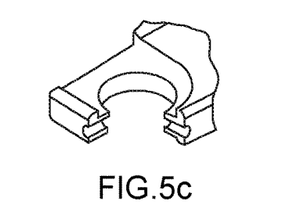
FIG. 5C illustrates part of the coupling portion in FIGS. 5A and 5B.

FIG. 5A illustrates an assembled version of the respective components in FIG. 3, in other words when the contact head 102 and pole 126 have been coupled to the fastener 125 of the apparatus 100 for securing such features relative thereto. FIG. 5B shows a cross-sectional view of such features. Returning to FIG. 5A, it is apparent that the coupling portion 122 includes a removable section 122a, which cooperates with respective sections of the coupling portion 122 to define first and second threaded apertures 127a, 127b. In other words, respective ends of the removable section 122a define aperture halves whereas non-removable parts of the coupling portion 122 define the other side of said first and second apertures 127a, 127b.

Figure 5D:
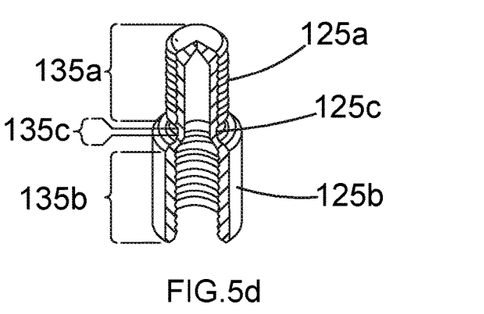
FIG. 5D illustrates a part cross-sectional view of the fastener in FIG. 5B in isolation.

FIG. 5D illustrates the mentioned fastener 125 in isolation, which defines an annular section 125c for being received within the opening 123 defined by the coupling portion 122 in use. Referring to FIGS. 5B and 5D, when the fastener 125 is located in the opening 123 and the removable section 122a of the coupling portion 122 is arranged to define the first and second apertures 127a, 127b, first and second threaded fasteners 131a, 131b are threaded into the first and second apertures which bear against the annular section 125c of the fastener 125 to hold it in place, in other words to rotationally lock the fastener 125 relative to the coupling portion 122.

With further reference to FIGS. 5B and 5D, the outer surface of the section 135c of the fastener 125 defining the annular section 125c is narrower than the outer surface of both the respective sections 135a, 135b of the fastener 125 defining the male and female threaded sections 125a, 125b. Thus when the first and second threaded fasteners 131a, 131b hold the removable section 122a in place around the fastener 125 the fastener 125 is restricted from moving translationally relative to the coupling portion 122 (even when the threaded fasteners 131a, 131b are loosened slightly to permit rotation of the fastener 125 relative to the coupling portion 122 while retaining the removable section 122a in place, which is discussed in more detail below). This translational locking is achieved by interaction of respective parts of the fastener 125 with upper and lower surfaces of the coupling portion 122 as is evident from FIG. 5B.

Returning to FIG. 3, in order to attach the contact head 129 to the fastener 125 the aforementioned first and second threaded fasteners 131a, 131b are loosened slightly so as to permit a user to turn the fastener 125 relative to the coupling portion 122, while retaining the removable section 122a in place. A user can then bring the male threaded section 125a of the fastener 125 and the female thread of the contact head 102 into engagement and subsequently secure such components together by turning the fastener 125 relative to the coupling portion 122 and also relative to the contact head 102. It will be appreciated that such movement will draw the male threaded section 125a of the fastener 125 into the female thread defined by the mounting section 129 of the contact head 102. The first and second threaded fasteners 131a, 131b are then tightened again so that they bear against the annular section 125c of the fastener 125 for rotationally locking it once again relative to the coupling portion 122. The pole 126 in FIG. 3 can then be secured to the fastener 125 by simply engaging the male thread section 124 of the pole 126 with the female thread section 125b of the fastener 125 and turning the pole relative to the fastener 125, which will draw the pole 126 into the fastener 125.

A method of using the heretofore described apparatus 100 will now be explained.

FIG. 6A illustrates that after the apparatus 100 has been coupled to a contact head 102 and pole 126 in the manner described, a user grips the pole 126 to lift the apparatus 100 and contact head 102 towards a catenary 128 suspended overhead. More specifically a force having an upwards component is applied to the apparatus 100 for urging the first and second flanges 118, 120 against the catenary 128.

FIG. 6B illustrates that the catenary 128 is received between such flanges 118, 120 and acts to urge them away from each other as the apparatus 100 is forced upwards, which thereby pivots the second arm 106 away from the first arm 104 out of the closed configuration. With the first and second arms 104, 106 out of the closed configuration the apparatus 100 is moved relative to the catenary 128 so that the catenary 128 is received between the first and second arms 104, 106.

Figure 6D:
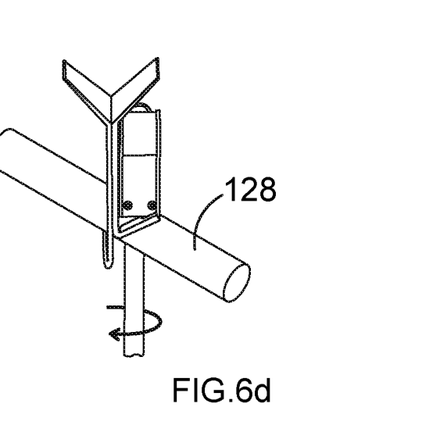

FIG. 6C illustrates that the apparatus 100 is moved relative to the catenary 128 such that the distal section of the first arm 104 that extends back on itself as heretofore described (the section denoted 130 in FIG. 6C) is located above the catenary 128. Subsequently the aforementioned biasing means acts to return the first and second arms 104, 106 back into the closed configuration. Due to interaction between the second arm 106 with the catenary 128, which restricts movement of the second arm 106, the biasing means causes the apparatus 100 to turn relative to the catenary 128 in the direction of the arrow denoted 132 in FIG. 6C in order for the first and second arms 104, 106 to move towards each other; and ultimately into the closed configuration as illustrated in FIG. 6D, which provides that the passage 110 defined by the arms 104, 106 surrounds the catenary 128.

Figure 6E:
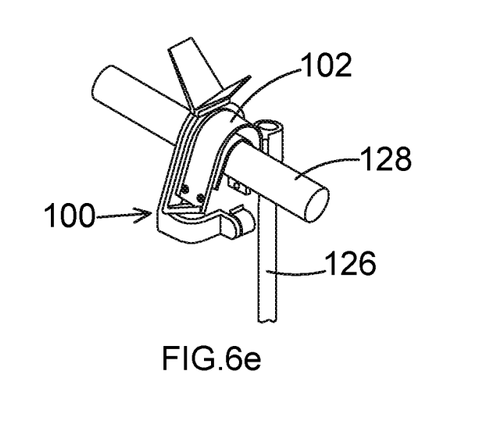

FIG. 6E illustrates that the user subsequently refrains from applying force with an upwards component to the apparatus 100 and thus lowers the contact head 102 into engagement with the catenary 128 for grounding the catenary 128 in a manner that will be familiar to persons skilled in the art. For instance a wire can be caused to extend between the contact head 102 and rail tracks below it in a manner similar to that described in EP0810691B1, although such a wire is omitted from the drawings herein to enhance their clarity.

A method of intentionally removing the apparatus 100 from a catenary 128 will now be explained with reference to FIGS. 7A to 7E.

Figure 7A:
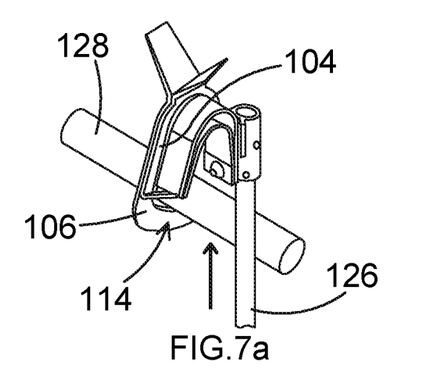
FIGS. 7A to 7E illustrate how the apparatus in FIGS. 3 to 5 is removed from use.

FIG. 7A illustrates that a user again grips the pole 126 to lift the apparatus 100. More specifically a force having an upwards component is applied to the apparatus 100 for urging the section of the second arm 106 for defining the lower section 114 of the passage 110 against the catenary 128.

Figure 7B:
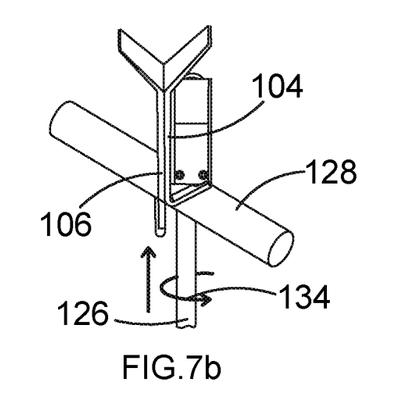

FIG. 7B illustrates that using the pole 126 the apparatus 100 is then turned relative to the catenary 128 such that the second arm 106 is moved in the direction of the first arm 104 (achieved by rotating the apparatus 100 in the direction of the arrow denoted 134 in FIG. 7B), whereby during rotation the second arm 106 is caused to bear against the catenary 128.

Figure 7C:
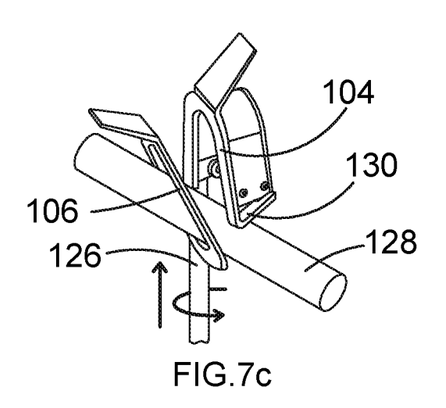

FIG. 7C illustrates that continuing to rotate the apparatus 100 causes the second arm 106 to pivot relative to the first arm 104 and so to move from the closed configuration due to the second arm 106 bearing against the catenary 128.

Figure 7D:
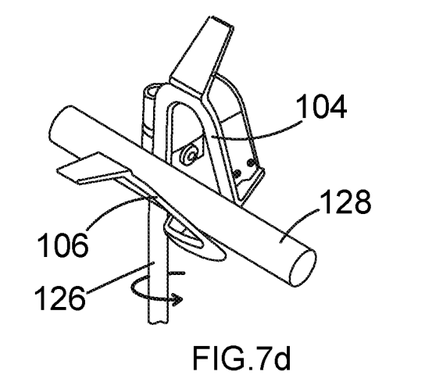

FIG. 7D illustrates that the apparatus 100 is turned such that the second arm 106 is moved relative to the first arm 104 so that said arms 104, 106 are wide enough apart for receiving the catenary 128. The apparatus 100 can then be lowered relative to the catenary 128 to remove the catenary 128 from the space between the first and second arms 104, 106. Comparing FIGS. 7C and 7D, after the distal part of the first arm that extends back on itself (the section denoted 130 in FIG. 7C) has passed over the catenary 128 during such turning of the apparatus 100, the upwards force exerted on the apparatus 100 by a user can be removed.

Figure 7E:
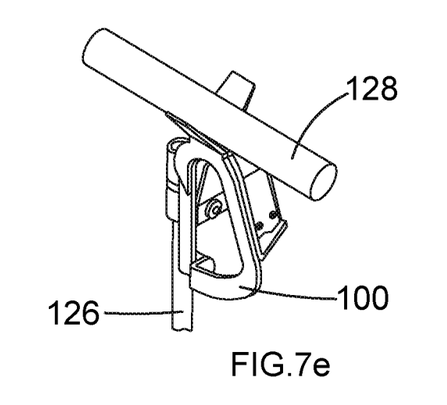

FIG. 7E illustrates that when the apparatus 100 has been lowered enough such that the catenary 128 is no longer located between the first and second arms 104, 106 said arms return to the closed configuration under action of the biasing means.

Details of the biasing means for urging the second arm 106 relative to the first arm 104 into the closed configuration are now discussed by describing how the spring biased pivot connection 107 between the first and second arms 104, 106 is assembled.

Figure 8A:
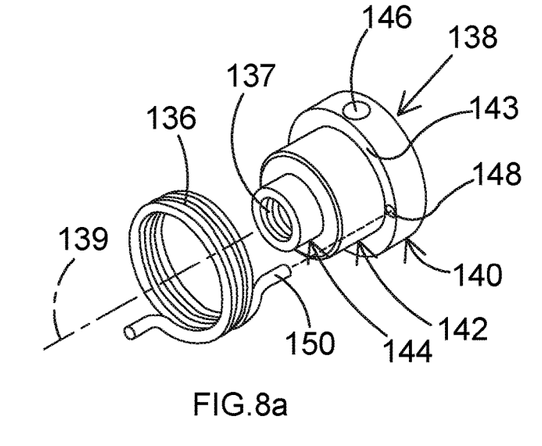
FIGS. 8A to 8E illustrate steps for pivotally coupling first and second arms of the apparatus in FIGS. 3 to 5 together.

FIG. 8A illustrates that in step S1 a coiled spring 136 is engaged with a connector 138. The connector 138 defines a threaded bore 137 extending along an axis 139. The outer surface of the connector 138 is circular and has three outer portions each having a different diameter. The first to third outer portions 140, 142, 144 have respectively decreasing outer diameters. The first outer portion 140 defines a hole 146 the purpose of which will become apparent later. The inner side of the stepped surface 143 between the first and second outer portions 140, 142 also defines a hole 148. When implementing step S1, the coiled spring 136 is caused to extend around the second outer portion 142 and a first end 150 of the coiled spring 136 is caused to extend into the hole 148 extending into the aforementioned stepped surface 143.

Figure 8B:
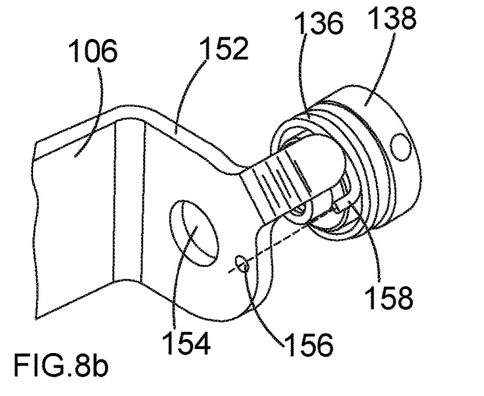

FIG. 8B illustrates that in step S2 the connector 138 as well as the coiled spring 136 are engaged with a connector section 152 of the heretofore described second arm 106. The connector section 152 defines a primary opening 154 in which the third outer portion 144 of the connector 138 is received. The connector section 152 also defines a secondary opening 156 in which the second end 158 of the coiled spring 136 is caused to extend. In the resulting arrangement of features the coiled spring 136 is thus sandwiched between the connector 138 and the connector section 152 of the heretofore described second arm 106, whereby the spring 136 surrounds the second outer portion 142 of the connector 138.

Figure 8C:
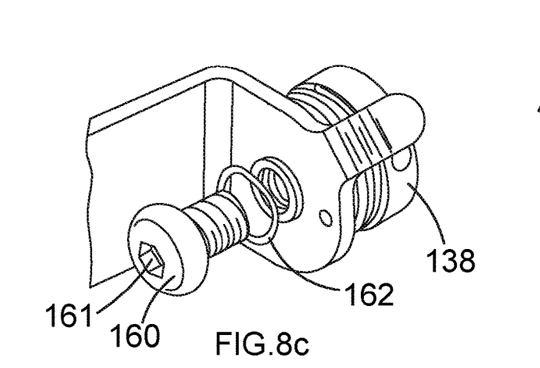

FIG. 8C illustrates that in step S3 the connector 138 is maintained stationary while a fastener 160 is threaded into the threaded bore 137 of the connector 138 for maintaining the connector 138 in connection with the connector section 152 of the heretofore described second arm 106. A washer 162 (e.g. formed of elastic material) may also be provided between the fastener 160 and the connector section 152 for accommodating the gap between the fastener 160 and the connector section 152. The resulting arrangement of features is configured such that if the fastener 160 is rotated (e.g. by using a key in cooperation with the key receiving head portion 161) then so will the connector 138, although such rotation will either stretch or compress the coiled spring 136 depending on the direction of rotation. Thus, by coupling the fastener 160 to the connector 138 these components are rotationally fixed relative to each other.

Figure 8D:
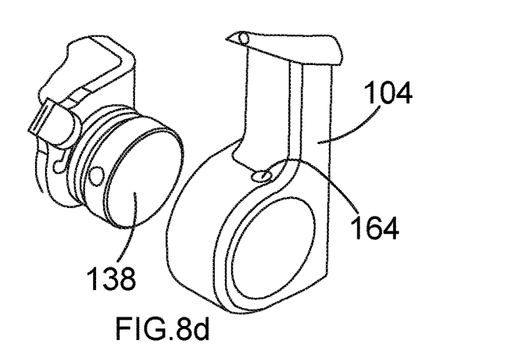

FIG. 8D illustrates that in step S4 the connector 138 is inserted into an opening of the first arm 104, whereby on doing so the first and second arms 104, 106 are engaged with each other and are arranged in the heretofore described closed configuration relative to each other for defining the passage 110.

Figure 8E:
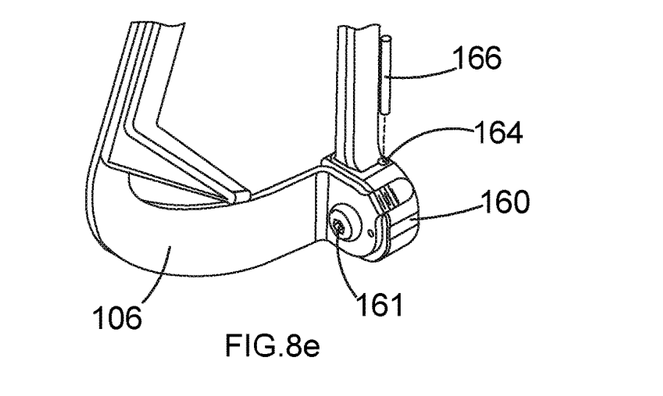

FIG. 8E illustrates that the fastener 160 is turned (e.g. by using a key in cooperation with the key receiving head portion 161) to impart a load in the coil spring 136. More specifically the fastener 160 is turned for causing rotation of the connector 138 such that the aforementioned hole 146 in its first outer portion (see FIG. 8a) aligns with an opening 164 extending through the first arm 104. A securing member 166 for example a bolt, pin or dowel is then inserted into the aligned openings for interacting with the connector 138 to maintain the coiled spring 136 in the loaded state. It will be appreciated from the foregoing that the loaded state of the coiled spring 136 is sufficient to bias the second arm 106 towards the first arm 104 so that upon the second arm 106 being pivoted away from the first arm 104 the spring bias acts to urge said second arm 106 relative to the first arm 104 back into the closed configuration.

The apparatus 100 described in relation to FIGS. 3 to 8E is made of metal such as stainless steel or aluminium and forms an electrical connection with the contact head 102 when coupled thereto. Thus no matter what direction the apparatus 100 and contact head 102 are forced in relative to a catenary 128 in use by electromagnetic forces or otherwise (e.g. shaking of the catenary 128 due to wind) either the contact head 102 or the apparatus 100 will engage the catenary 128 for maintaining an electrical connection between the catenary 128 and the rail tracks beneath it.

Figure 9:
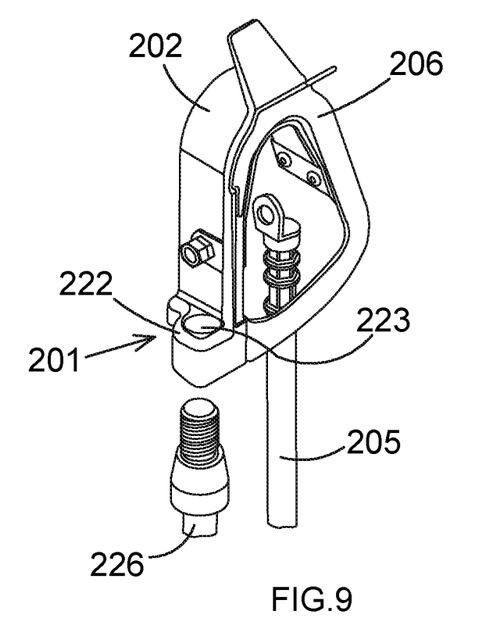
FIGS. 9 to 11 illustrate another embodiment of an apparatus for restricting a contact head of a catenary grounding device from falling from a catenary in use.
Figure 10:
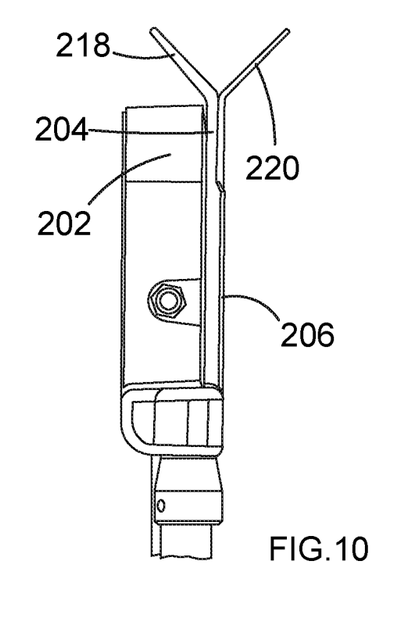
Figure 11:
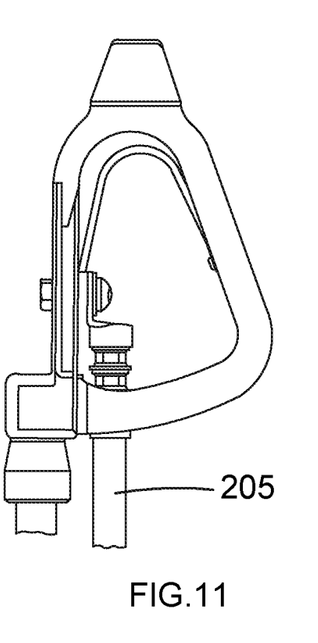

FIGS. 9 to 11 illustrate a second embodiment in which pivotally coupled first and second arms of the kind heretofore described form an integral part of a contact head of a catenary grounding device, wherein like components are denoted with similar numerals increased by 100. This contrasts with the previous embodiment described in relation to FIGS. 3 to 8E in which the apparatus 100 and contact head 102 are provided separately and can be removably coupled to each other; so that an existing catenary grounding device can be upgraded by retrofitting it with the apparatus 100.

In the second embodiment the first arm 204 and the contact head 202 are formed from the same piece of metal. The overall apparatus (i.e. combined contact head portion and pivotally coupled first and second arms portion) embodying principles of the second embodiment is illustrated in FIG. 9 and denoted 201. A pole 226 can be connected with a threaded opening 223 of the apparatus 201 for enabling a user to lift it up into contact with a catenary and subsequently dismount it in accordance with the principles of the method described in connection with FIGS. 6A to 6E and 7A to 7E. FIGS. 9 and 11 illustrate a wire 205 for extending between the contact head 202 portion and rail tracks below it in a manner similar to that described in EP0810691B1. In particular a lug of the wire can be attached in electrical contact with the contact head portion 202 of the apparatus 201 by a fastener.

In other embodiments the contact head portion and the first arm of the pivotally coupled first and second arms portion may not necessarily be formed from the same piece of metal and instead the contact head portion and the first arm may be fixed together by welding or otherwise e.g. by separately attaching these features to a connecting feature such as a metal plate. It will be appreciated that in embodiments in which the first arm 204 is fixed directly to the contact head 202 such components will be suitably shaped to enable this.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

For example the first and second arms 104, 106 (204, 206) need not necessarily be configured to pivot relative to each other and in some embodiments they could instead be arranged to move translationally relative to one another. In particular the first and second arms 104, 106 (204, 206) could be separated and thus moved out of the closed configuration by urging them translationally relative to each other, wherein cooperating features of the first and second arms 104, 106 (204, 206) guide such movement. Biasing means such as a spring or otherwise (e.g. a flexible strip of material) could be provided for causing the first and second arms 104, 106 (204, 206) to move back into the closed configuration relative to each other.

Persons skilled in the art will appreciate from the foregoing that the features illustrated in the drawings do not need to have exactly the same shape as illustrated in order to function and that there is some design freedom. For example the flanges 118, 120 (see FIG. 4) do not need to be at the specific angle relative to each other as illustrated. Moreover the surfaces defined by such flanges do not necessarily need to be planar and could be curved or could include a step shaped feature for example. Although the passage 110 defined by the first and second arms 104, 106 (see FIG. 5) has rounded and also straight edges, in some embodiments it could be configured to have all straight edges (and be square or rectangle shaped for example) or to have all curved edges (and be oval shaped for example).

Figure 12:
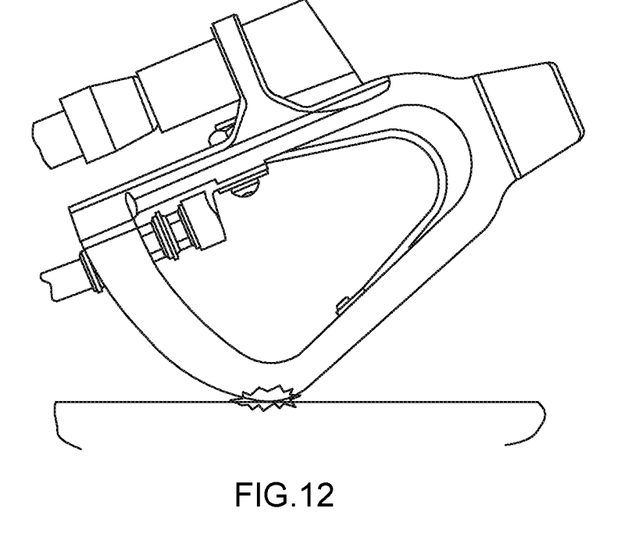
FIG. 12 illustrates the arrangement in FIGS. 3 and 4 impacting the ground.

Nevertheless it is here mentioned, with reference to FIG. 12, that the shape of the arms illustrated in the drawings provides that in case of a user accidentally dropping the apparatus on the floor directly on the second arm 106 (206), a step on the first arm 104 (204) acts to create a point of support to reduce the stresses at the biasing means and thus reduce the likelihood of damage to the biasing means.

The means of connecting the apparatus 100 in FIG. 3 to the pole 126 and contact head 102 does not necessarily need to be of the exact nature described. In particular persons skilled in the art will appreciate that the male/female relationship of the threaded portions heretofore discussed could be reversed. For example the top section 125a of the fastener 125 could define a female thread for receiving a male thread section of a contact head 102. Similarly the bottom section 125b of the fastener 125 could define a male thread for entering a female thread section of the pole 126. Moreover both the top and bottom section 125a, 125b could define a male thread section or a female thread section. Furthermore the mechanism of attaching the contact head 102 and the pole 126 to the apparatus 100 by virtue of the fastener 125 is an example of a suitable mechanism. In practice any suitable means of coupling such components together could be used provided an electrical connection is formed between the apparatus 100 and the contact head 102.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A catenary grounding device operable for connecting the catenary in an electrical wire to an electrical ground, the catenary grounding device comprising:
  a non-conducting pole;
  a contact head including:
    a conducting contact portion shaped as an arch extending longitudinally along an arch axis and operable for contacting the electrical wire when captured in the catenary grounding device, the contact portion also partially defining a downwardly open arch mouth;

a mounting section secured to a rearward arch leg of the contact portion; and a grounding wire connected to the contact portion and operable for conducting electricity from the electrical wire via the contact head to the ground;

an apparatus connected to the contact head for restricting the contact head unintentionally falling from the electrical wire when in use, the apparatus comprising:

a planar first arm is shaped as an inverted U and includes a first upper section, a coupling portion, and a pivot connection, the first upper section is shaped as a first hook and partially defines a downwardly open first mouth, the first upper section including a first rearward leg and an upward first apex and a first forward leg with a first free end at a first distance below the first apex, and the coupling portion extends rearwardly from the first rearward leg and is connected to the contact head such that the contact portion of the contact head and the first upper section of the first arm are fixed in planer parallel with the arch mouth and first mouth in axial alignment, and the pivot connection is a rotatable pivot joint located at a lower end of the first rearward leg and defines a pivot axis extending rearward and forward and perpendicular to the arch axis;

a planar second arm is shaped as a rearward facing C and includes a second upper section, a lower section, and a forward section between the second upper and lower sections, the second upper section including a second upward apex and a second rearward leg with a second free end at a second distance below the second apex with the second distance less than the first distance, and the second arm partially defines a rearwardly open second mouth, and, at a rearward end of the lower section, the second arm is pivotably mounted to the pivot joint of the first arm and is movable between a closed position and an open position; and wherein the closed position the first arm and second arm are in planar parallel contact with the first mouth alongside the lower section of the second arm and with the rearward leg of the first arm alongside the second mouth to together partially define a completely circumscribed passage axially parallel to the arch axis; and wherein the open position the second upper section of the second arm is pivoted around the pivot axis and spaced apart from the upper section of the first arm to partially define a gap between the first arm and the second arm, the gap opening upward and narrowing downward and extending in parallel with the pivot axis.

2. A catenary grounding device according to claim 1 and further including:

a first flange extending upward and leftward from the first upper section of the first arm;

a second flange extending upward and rightward from the second upper section of the second arm; and whereby the second arm can be moved to the open position by pressing a crotch partially defined between the first flange and the second flange against the electrical wire to be captured in the passage.

3. A catenary grounding device according to claim 1 wherein:

the mounting section of the contact head partially defines a vertical bore including an interior female thread and a downward opening;

the coupling portion of the first arm partially defines a through hole with a vertical axis perpendicular to the pivot axis; and a fastener including a male threaded portion is installed upward through the through hole into and threadably engaging the bore of the mounting section.

4. A catenary grounding device according to claim 3 wherein:

the fastener includes:

a first section defining an external first diameter and including the male threaded portion;

a second section defining an external second diameter larger than the first diameter, connected to the first section at a first axial end of the second section, and partially defining a cylindrical bore with an opening at a second axial end distal from the first section, and including a female thread inside the bore;

an annular land located at the first axial end of the second section and extending radially between the first diameter of the first section and the second diameter of the second section; and the through hole of the coupling portion of the first arm defines an internal third diameter greater than the external first diameter and less than the external second diameter.

5. A catenary grounding device according to claim 4 wherein the non-conducting pole includes a threaded section, and the threaded section is threaded into the cylindrical bore of the fastener.

6. A catenary grounding device according to claim 1, and further including a spring to bias the second arm into the closed position.

7. A catenary grounding device according to claim 6, and wherein the spring is an elastic material elastically deformable from the closed position to the open position.

8. A catenary grounding device according to claim 6, and wherein the spring is a coil spring.

9. A catenary grounding device according to claim 8, and wherein the coil spring is a torsion spring located around the pivot axis with a first axial end of the coil spring anchored to the first arm and a second axial end of the coil spring anchored to the second arm.

* * * * *